Patented July 30, 1935

2,009,594

UNITED STATES PATENT OFFICE 2,009,594

RAKE CLEANING ATTACHMENT

Nelson Snyder, Grandville, Mich., assignor of one-half to Frances E. Snyder, Grandville, Mich.

Application July 16, 1934, Serial No. 735,337

4 Claims. (Cl. 55—146)

This invention relates generally to a rake and more particularly to means for automatically cleaning the same. Also, this means serves as a cleaning blade in some instances.

I am aware that there are many devices of this general character but my invention represents several very substantial improvements over these devices. These reasons will become apparent as the description proceeds.

Briefly described, my invention consists of a straight bar of suitable cross section with two U-shaped bracket members pivotally fastened thereto and adapted to extend the back of the rake and then downwardly on the opposite side thereof and terminating in inturned ends having recesses therein to permit slidable and adjustable engagement of two of the tines of the rake therewith. The straight bar is normally positioned closely adjacent to the ends of the tines.

One primary advantage will be obtained by my construction, namely, the bar is raised only a relatively short distance as the rake is utilized and thus the dead grass, leaves, and the like, which become entangled with the ends of the tines, are only permitted to slide upwardly along the tines a minimum distance. In other words, the cleaning bar rides along over the top of the grass which is being raked and does not raise above this plane and consequently the weight of the bar maintains the leaves, dead grass, and the like at the lower points of the tines. As the rake is lifted after each stroke, the weight of the bar causes the material on the tines to be disengaged therefrom and this occurs upon the initial lifting of the rake at each end of its operating or cleaning stroke. Thus, there is no accumulation of material upon the tines of the rake.

Another advantage follows from the use of my improved appliance. That is, the bar is normally located very closely adjacent to the pointed ends of the several tines and the rake can consequently be utilized to rake small stones, pebbles, acorns and the like inasmuch as these objects do not cause raising of the cleaning bar.

Another advantage resides in the fact that the bar is of simple construction and also the other two elements of the device are very easily manufactured and thus I obtain the desirable attributes of ease and economy of manufacture.

Yet another advantage resides in the positioning of the cleaning bar at the rear of the tines whereby the user may tilt the rake handle upwardly more or less in order to somewhat control the engagement of the cleaning bar with the ground. Also, the upper ends of the two U-shaped bracket connecting members serve as means for forcibly driving the cleaning bar along the tines of the rake if this should be desired. However, this is seldom necessary.

Other advantages and objects will become apparent as the description proceeds.

In the drawing:—

Fig. 1 is a perspective view of my invention as applied to a rake.

Fig. 2 is a rear view of my device.

Fig. 3 is a sectional view taken along the line 3—3 of Fig. 1.

Fig. 4 is a sectional view taken along the line 4—4 of Fig. 3.

Like numerals refer to like parts in the several views.

In the drawing, numeral 10 indicates the blade of a rake, having tines 11, and this blade is continued in arms 12 which terminate adjacent each other, see Fig. 1, and are securely held in a handle 13 by means of a ferrule 14.

As shown in the drawing, a bar 15, of rectangular cross section, is located adjacent the outer faces of the several tines and U-shaped clips 16 extend over the blade 10. The members 16, see Figs. 3 and 4 particularly, have outer arms 17 and inner arms 18.

The arm 17 is pivoted as indicated at 19 onto the cleaning bar 15 and thus the U-shaped member 16 is movable relative to the bar 15. The other arm 18 of the member 17 has its lower end turned inwardly and terminates in the spaced prongs 20, these prongs straddling one of the tines 11. See Fig. 3.

The U-shaped member 16 may be formed of yieldable or bendable material and thus the cleaning bar may be slid to position by moving the arms 18 to the dotted line position as shown in Fig. 4. When the device is placed in position upon a rake the bar 15, as shown in Fig. 2, is located close to the ends of the tines and the device may slide upwardly as shown in Fig. 4 or else may slide upwardly until the prongs 20 engage underneath the bar 10.

It will be noted that the prongs 20 are spaced apart so as to provide proper clearance therebetween for the tine 11 and this fact, together with the pivotal mounting of the clip 16, permit attachment of my device to rakes having tines of different spacing. Thus my attachment is universal in character.

From the above necessarily brief description, it will be appreciated that I have inventively cre- July 30, 1935.    E. VAN DER PYL    2,009,595
ANTISLIPPING TREAD UNIT
Filed June 27, 1932
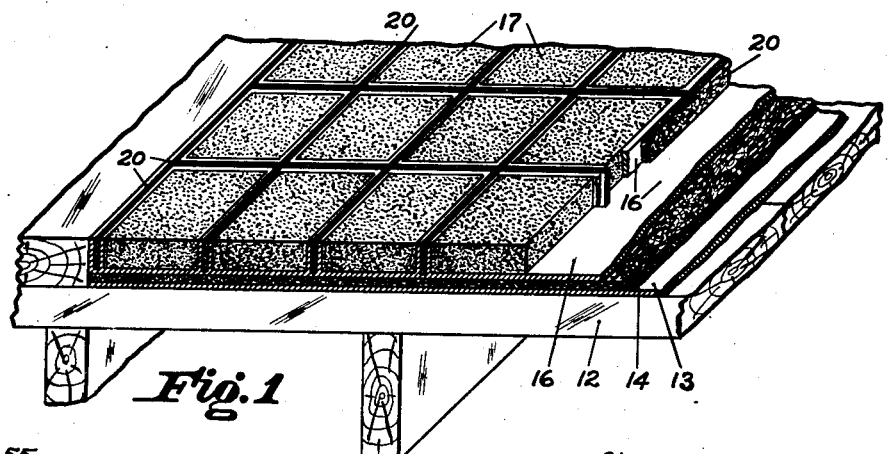
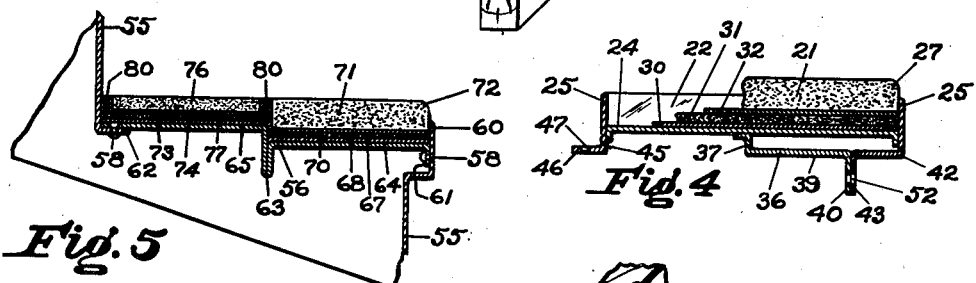
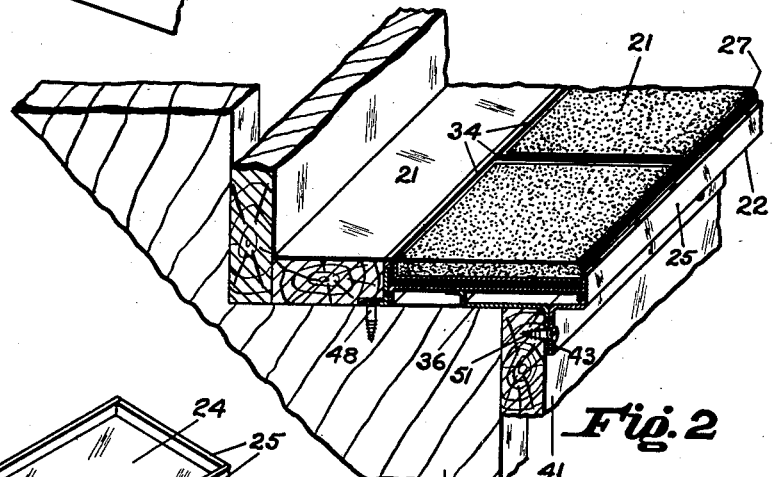
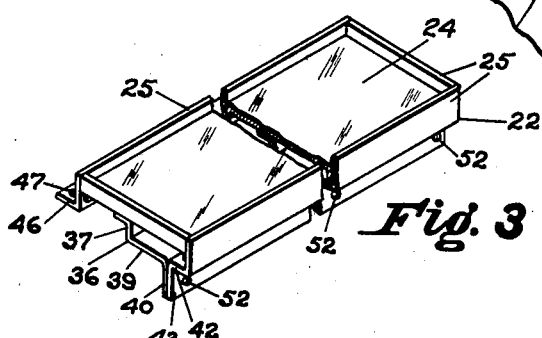
Inventor
EDWARD VAN DER PYL
By Clayton L. Jenks
Attorney
WITNESS
Edward H. Goodrich